Aug. 26, 1924.
B. M. SCHAUMAN
1,506,386
DAMPER
Filed Dec. 30, 1921
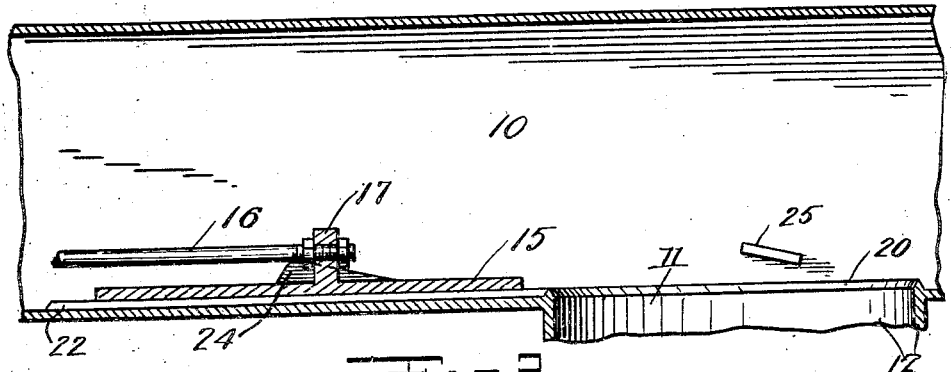
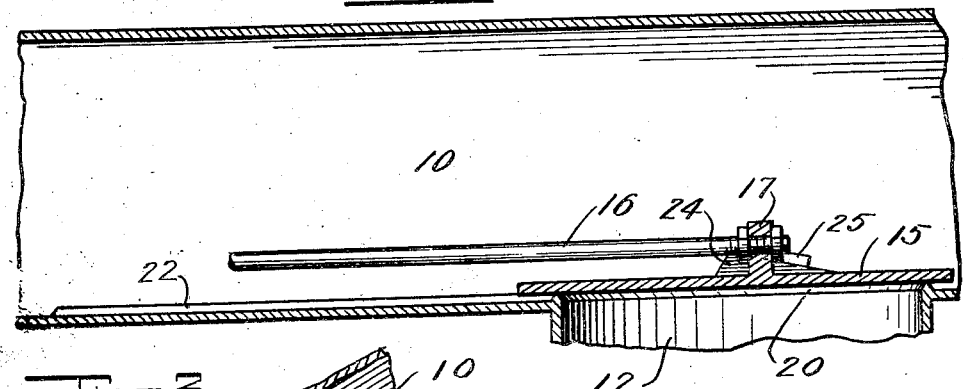
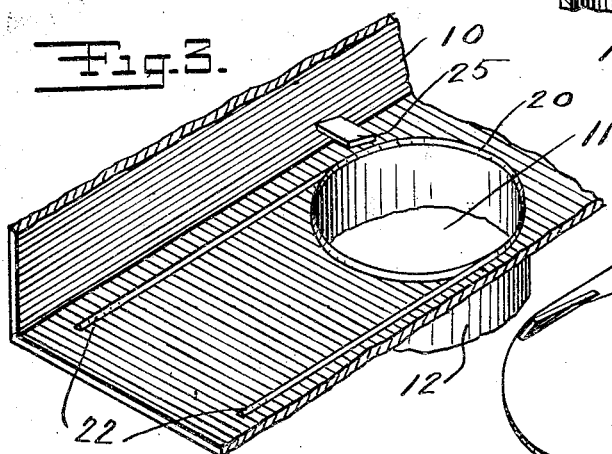
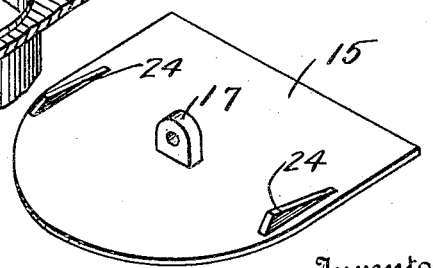
Inventor
Bror Max Schauman
By his Attorney
Frank J. Hent Patented Aug. 26, 1924.

1,506,386

UNITED STATES PATENT OFFICE.

BROR MAX SCHAUMAN, OF ATLANTIC HIGHLANDS, NEW JERSEY, ASSIGNOR TO AN ASSOCIATION COMPRISING GRANDIN V. JOHNSON, OTTO GAUTSCHY, AND HARRY W. JOHNSON, ALL OF HIGHLANDS, NEW JERSEY; WILLIAM KOCH, OF LONG BRANCH, NEW JERSEY; AND BROR MAX SCHAUMAN, OF ATLANTIC HIGHLANDS, NEW JERSEY, ONE-FIFTH TO EACH MEMBER.

DAMPER.

Application filed December 30, 1921. Serial No. 525,889.

*To all whom it may concern:*

Be it known that I, BROR MAX SCHAUMAN, a citizen of the United States, residing at Atlantic Highlands, in the county of Monmouth and State of New Jersey, have invented certain new and useful Improvements in Dampers, of which the following is a specification.

This invention relates to dampers for effectively sealing an opening in a flue. After a damper has been in use for a time, difficulty is often experienced in obtaining an absolutely tight sealing of the opening which it covers due to the accumulation of soot or other foreign matter upon the damper seat and upon the damper surface which rests on the seat. It is therefore one object of this invention to provide a damper of simple and economical design which shall clean the damper seat by its operation, and to provide means whereby actuation of the damper will automatically clean the damper surface which cooperates with the damper seat.

A further object of this invention is to provide simple and efficient means for insuring an absolute sealing of a flue opening in the fully closed position of the damper.

Other objects and advantages will hereinafter appear.

In the accompanying drawing:

Figure 1 is a sectional view of a damper applied to a flue having an opening, the damper being shown in open position;

Figure 2 is a similar view, but with the damper in closed position;

Figure 3 is a perspective view of a portion of the flue as adapted to cooperate with the damper;

Figure 4 is a perspective view of the damper.

Referring to the drawing, the invention is shown as applied to a flue 10, which in this case is a hot-air pipe, said flue having an opening 11, which is here shown as leading to an auxiliary pipe 12. It will be understood that the damper may be applied to an opening in any type of flue. To close the opening 11 there is provided a damper 15, which may be reciprocated by a rod 16 preferably attached to a lug 17 provided on the damper for this purpose. When the damper is moved over the opening 11 it will completely cover said opening. If, however, the damper slides with its under surface in contact with the inner surface of the wall of the flue 10, the constant accumulation of foreign matter upon said surface of the flue, especially around the opening 11, and upon the under surface of the damper, prevents a tight fit of the damper over the opening. To obviate this condition, the inner surface of flue 10 is provided with a raised portion or rim 20 surrounding the opening 11, said rim terminating preferably in a comparatively sharp upper edge which acts as a scraper to clean the under surface of the damper as it moves thereover. Also, the damper seat is no longer a large surface which can be caked unevenly with foreign matter, but is a thin edge which the damper, in moving thereover, can readily keep clean. It will thus be apparent that the rim surrounding the opening 11 is a means whereby both the under surface of the damper and the damper seat may be kept clear of foreign matter, thus insuring proper sealing of the opening. The damper is maintained at the level of said rim 20 by raised portions 22, of substantially the same height as the rim and extending therefrom in the direction in which the damper is moved, said raised portions forming rails over which said damper is reciprocated. The damper is thus held out of contact with the inner surface of the flue, which assists in keeping the under surface of the damper clear of deposit. If foreign matter is collected on the inner surface of flue 10 to a height above the rim 13, the forward edge of the damper pushes the excess over the rim.

By thus keeping the damper seat and the under surface of the damper clear of foreign matter, a tight fit may be obtained in any position of the damper with respect to the opening. However, when the damper is partly open the tightness of the fit is not as important as when the opening is to be completely closed, in which case the opening should be perfectly sealed. For this purpose the damper may be provided with wedge-shaped lugs 24, preferably one on each side, which operate beneath inclined lugs or projections 25 fixed to the walls of the flue, so that in the closed position of the damper the lugs 24 will be forced downwardly by the lugs 25 to press the damper tightly against rim 20. A positive means for holding the damper to its seat in the closed position of the damper is thus provided.

I claim:—

1. In combination with a flue having an opening, a slide damper for closing said opening, said flue having a raised sharp edge surrounding said opening to form a damper seat, the operation of said damper on said seat serving to clean the seat while the seat cleans said damper.

2. In combination with a flue having an opening, a self-cleaning slide damper means for said opening, said means comprising a raised sharp damper seat within said flue surrounding said opening, and a slide damper operating on said seat so that said damper cleans said seat and said seat cleans said damper during the operation of the damper.

3. In combination with a flue having an opening, a damper for closing said opening, said flue having a rim surrounding said opening and projecting into said flue to form a damper seat, the under surface of said damper having sliding engagement with said rim, the operation of said damper serving to clean said rim while said rim cleans the under surface of said damper, and means for holding said damper out of contact with the walls of the flue and for guiding said damper into sliding engagement with said rim.

4. In combination with a flue having an opening, a damper for closing said opening, said flue having a rim surrounding said opening and projecting into said flue to form a damper seat, the under surface of said damper having sliding engagement with said rim, the operation of said damper serving to clean said rim while said rim cleans the under surface of said damper, and means for holding the damper out of contact with the walls of the flue and for guiding said damper into sliding engagement with said rim, said means comprising raised portions in said flue and on which said damper is reciprocable.

5. In combination with a flue having an opening, a damper for closing said opening, said flue having a rim surrounding said opening and projecting into said flue to form a damper seat, the under surface of said damper having sliding engagement with said rim, the operation of said damper serving to clean said rim while said rim cleans the under surface of said damper, and means for holding said damper out of contact with the walls of the flue and for guiding said damper into sliding engagement with said rim, said means comprising extensions of said rim, so that said rim and extensions form a continuous bearing for the damper.

6. In combination with a flue having an opening, a damper reciprocable within said flue to cover and uncover said opening, and positive means for clamping said damper in position to seal the opening effectively.

7. In combination with a flue having an opening, a damper reciprocable within said flue to cover and uncover said opening, and positive means for clamping said damper in position to seal the opening effectively, said means becoming effective in the fully closed position of the damper.

8. In combination with a flue having an opening, a damper reciprocable within said flue to cover and uncover said opening, and positive means for clamping said damper in position to seal the opening effectively, said means comprising members carried by said damper, and members carried by said flue and engaging said first-named members when the damper is in the fully closed position to force said damper against said flue directly over said opening.

9. In combination with a flue having an opening, said flue having a rim surrounding said opening and projecting into said flue, a damper reciprocable on said rim to cover and uncover said opening, and means for clamping said damper tightly against said rim to seal said opening effectively, said means comprising members carried by said damper, and members carried by said flue and engaging said first-named members in the fully closed position of the damper to force said damper against said rim.

10. In combination with a flue having an opening, said flue having a rim surrounding said opening and projecting into said flue, a damper reciprocable on said rim to cover and uncover said opening, and means for clamping said damper tightly against said rim to seal said opening effectively, said means comprising wedge-shaped lugs fixed to said damper, inclined lugs fixed to said flue, said wedge-shaped lugs engaging said inclined lugs when the damper is in the fully closed position to force said damper against said rim.

In testimony whereof I affix my signature.

BROR MAX SCHAUMAN.